(12) United States Patent
Mitsuishi et al.

(10) Patent No.: US 8,835,532 B2
(45) Date of Patent: Sep. 16, 2014

(54) INK

(75) Inventors: Tomoko Mitsuishi, Nagano (JP); Takashi Namiki, Nagano (JP); Ryuji Yamada, Nagano (JP); Isao Tabayashi, Nagano (JP)

(73) Assignee: Mimaki Engineering Co., Ltd., Nagano (JP)

( * ) Notice: Subject to any disclaimer, the term of this patent is extended or adjusted under 35 U.S.C. 154(b) by 115 days.

(21) Appl. No.: 13/514,052

(22) PCT Filed: Dec. 2, 2010

(86) PCT No.: PCT/JP2010/071557
§ 371 (c)(1),
(2), (4) Date: Jul. 2, 2012

(87) PCT Pub. No.: WO2011/070961
PCT Pub. Date: Jun. 16, 2011

(65) Prior Publication Data
US 2012/0270984 A1      Oct. 25, 2012

(30) Foreign Application Priority Data
Dec. 10, 2009   (JP) .................................. 2009-280466

(51) Int. Cl.
| | | |
|---|---|---|
| C09D 11/10 | (2014.01) | |
| C08K 5/07 | (2006.01) | |
| C08K 5/101 | (2006.01) | |
| C09D 11/32 | (2014.01) | |
| C09D 11/38 | (2014.01) | |
| C09D 11/00 | (2014.01) | |
| C09D 11/30 | (2014.01) | |

(52) U.S. Cl.
CPC ................ *C09D 11/38* (2013.01); *C09D 11/32* (2013.01); *C09D 11/00* (2013.01); *C09D 11/30* (2013.01)
USPC ........... 523/160; 524/317; 524/361; 524/365; 524/567

(58) Field of Classification Search
CPC ........ C09D 11/10; C09D 11/033; C08K 5/07; C08L 27/06
USPC .......................................... 524/365; 523/160
See application file for complete search history.

(56) References Cited

U.S. PATENT DOCUMENTS 4,178,324 A * 12/1979 Chattha .......................... 525/188
(Continued)

FOREIGN PATENT DOCUMENTS

| JP | 54-143562 | 11/1979 |
|---|---|---|
| JP | 04-170475 | 6/1992 |

(Continued)

*Primary Examiner* — Vu A Nguyen
(74) *Attorney, Agent, or Firm* — Jianq Chyun IP Office

(57) ABSTRACT

An ink is provided that does not easily cause an offset or blocking upon winding a print, even when the ink contains a lactic acid ester or a lactone solvent. In order to solve such a problem, the ink of the present invention includes: a colorant; and a ketone compound of the following general formula (1), $$R^1-CO-R^2 \quad (1),$$

wherein $R^1$ and $R^2$ each independently represent an alkyl group of 1 to 10 carbon atoms, where the total number of carbon atoms in $R^1$ and $R^2$ is 5 to 11, and $R^1$ and $R^2$ may form a ring when the sum of the carbon atoms in $R^1$ and $R^2$ is 6 or more.

1 Claim, 2 Drawing Sheets

(56) References Cited

U.S. PATENT DOCUMENTS

| | | | |
|---|---|---|---|
| 5,776,569 A * | 7/1998 | Cole | 428/35.8 |
| 6,030,741 A * | 2/2000 | Doi et al. | 430/191 |
| 6,406,528 B1 * | 6/2002 | Macholdt et al. | 106/31.49 |
| 2007/0263018 A1 * | 11/2007 | Vanini | 347/1 |

FOREIGN PATENT DOCUMENTS

| | | |
|---|---|---|
| JP | 04-183762 | 6/1992 |
| JP | 2007-092081 | 4/2007 |
| JP | 2008-280537 | 11/2008 |
| JP | 2009-114256 | 5/2009 |

* cited by examiner

INK

CROSS-REFERENCE TO RELATED APPLICATION

This application is a 371 of international application PCT application Ser. No. PCT/JP2010/071557, filed on Dec. 2, 2010, which claims the priority benefit of Japan application no. 2009-280466, filed on Dec. 10, 2009. The entirety of the above-mentioned patent applications is hereby incorporated by reference herein and made a part of this specification.

TECHNICAL FIELD

The present invention relates to inks, particularly to inks for inkjet printing.

BACKGROUND ART

Inkjet printing has many advantages, including more freedom to choose a print medium, and high-speed printing. Inks containing a colorant and a solvent are commonly used for inkjet printing.

For environmental friendliness, there have been proposed inks that contain highly biodegradable, plant-derived solvents such as lactic acid esters and γ-butyrolactone (see, for example, Patent Document 1).

CITATION LIST

Patent Documents

Patent Document 1 JP-A-2007-92081

SUMMARY OF THE INVENTION

Problems that the Invention is to Solve

In the field of signs and other related industries, it is common practice to perform inkjet printing on media such as a vinyl chloride sheet, and to store the finished prints after directly winding the prints on a paper core or the like used to wind media for storage. However, use of an ink containing a solvent such as a lactic acid ester and γ-butyrolactone is problematic, because it causes an offset (a transfer of the ink from the printed surface to a paperboard) or blocking (sticking of the printed surface to a paperboard), and degrades the printed surface.

The present invention has been made under these circumstances, and it is an object of the invention to provide an ink that does not easily cause an offset or blocking upon winding a print, even when the ink contains a lactic acid ester or a lactone solvent.

Means for Solving the Problems

In order to solve the foregoing problem, the present invention provides an ink that contains a colorant, and a ketone compound of the following general formula (1)

(1)

In the general formula (1), $R^1$ and $R^2$ each independently represent an alkyl group of 1 to 10 carbon atoms. The total number of carbons in $R^1$ and $R^2$ is 5 to 11, and $R^1$ and $R^2$ may form a ring when the sum of the carbon atoms in $R^1$ and $R^2$ is 6 or more.

The ink of the present invention contains the specific ketone compound as above, and does not easily cause an offset or blocking upon winding a print, even when the ink contains a lactic acid ester or a lactone solvent. With the ink of the present invention, both the print quality and the print speed can be effectively improved while reducing the burden on the environment.

From the standpoint of more reliably preventing an offset or blocking upon winding a print, it is preferable that the ketone compound be 2-heptanone or 2-octanone.

It is preferable that the ink of the present invention contain a pigment as the colorant, and further contain a vinyl chloride copolymer resin. In this way, preservation stability can be improved while sufficiently ensuring pigment dispersion, and changes in the particle size distribution of the pigment after long storage can be suppressed.

Advantage of the Invention

According to the present invention, an ink can be provided that does not easily cause an offset or blocking upon winding a print, even when the ink contains a lactic acid ester or a lactone solvent.

MODE FOR CARRYING OUT THE INVENTION

Figure 1:
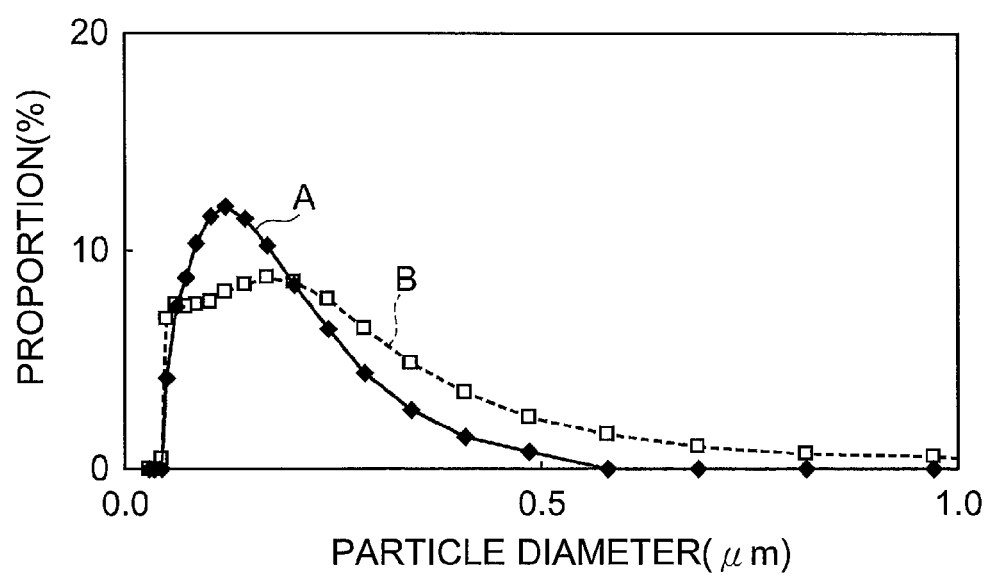
FIG. 1 is a graph representing the particle size distribution of a pigment in an ink of Example 1.

An ink of the present embodiment contains a colorant, and a ketone compound of the following general formula (1)

$$R^1\text{—CO—}R^2 \qquad (1)$$

In the general formula (1), $R^1$ and $R^2$ each independently represent an alkyl group of 1 to 10 carbon atoms. The total number of carbons in $R^1$ and $R^2$ is 5 to 11, and $R^1$ and $R^2$ may form a ring when the sum of the carbon atoms in $R^1$ and $R^2$ is 6 or more.

Examples of the ketone compound of general formula (1) include 2-heptanone, 2-octanone, 2-nonanone, 3-nonanone, 2-decanone, 2-undecanone, and 5-dodecanone.

Of these ketone compounds, 2-heptanone and 2-octanone are preferred. An offset and blocking can be more reliably prevented with these ketone compounds. This is believed to be due to the property of the 2-heptanone and 2-octanone to strongly attack a medium such as a vinyl chloride sheet, and provide appropriate permeability to the medium, making it possible to further accelerate drying of ink droplets.

Table 1 presents the media attacking property of ketone compounds dropped onto the white vinyl chloride glossy medium SPC-0481 (Nichiei Kakoh Co., Ltd.). In the table, 「○」 means strong penetration for the medium, and thus strong attacking property, 「△」 means weak penetration for the medium, and thus weak attacking property, and 「χ」 means no penetration for the medium, and thus no attacking property.

TABLE 1

| | 2-heptanone | 2-octanone | 2-nonanone | 3-nonanone | 2-decanone | 2-undecanone | 5-dodecanone |
|---|---|---|---|---|---|---|---|
| Media attacking property | ○ | ○ | Δ | Δ | Δ | Δ | Δ |

When the ink of the present embodiment contains 2-octanone, print bleeding can be reduced even in high-speed printing performed using a medium such as a vinyl chloride sheet by inkjet printing, and an image of improved quality can be formed. The inventors of the present invention believe that the foregoing effect can be obtained because the use of 2-octanone further improves both ink dryness and the permeability into the medium, and as a result accelerates drying of ink droplets, and avoids contact with the subsequent ink droplets in liquid form. It should be noted that simply mixing a fast-drying volatile solvent is not sufficient to improve the print quality, because it causes problems such as thickening of the ink at the head nozzle portion upon drying, and condensation that occurs in the vicinity of the nozzle upon contacting of the volatile solvent to the head.

The mixed amount of the ketone compound of general formula (1) is preferably from 1 to 10 mass % with respect to the total amount of the solvent contained in the ink. With a mixed amount of the ketone compound less than 1 mass %, it tends to become difficult to sufficiently prevent an offset or blocking upon winding a print. Above 10 mass %, severe penetration into a print medium tends to occur. Considering these, the mixed amount is more preferably from 3 to 10 mass %, further preferably from 5 to 10 mass %.

It is preferable that the ink of the present embodiment further contains a solvent other than the ketone compound. Examples of such solvents include lactic acid esters (such as methyl lactate, ethyl lactate, and butyl lactate), lactones (such as γ-butyrolactone), propylene diglycol acetate, propylene diglycol monomethyl ether acetate, dipropylene glycol dimethyl ether, and 3-methoxy-n-butyl-acetate.

Further, from the standpoint of reducing the environmental burden, the ink of the present embodiment preferably contains a lactic acid ester. Preferably, such a solvent is mixed in 10 to 40 mass % with respect to the total solvent amount.

Further, in order to further reduce print bleeding in high-speed printing performed on a medium such as a vinyl chloride sheet, the ink of the present embodiment preferably contains a solvent having a contact angle (measurement temperature 25.0° C.) of 10° or more with respect to the medium. Examples of such solvents include γ-butyrolactone, propylene diglycol acetate (PGDA), and 3-methoxy-n-butyl-acetate (MBA).

In the ink of the present embodiment, it is preferable that the ketone compound of general formula (1) and the solvent other than the ketone compound be appropriately mixed so as to confine the solvent viscosity in a range of 0.5 to 10 mPa·s.

Further, in the ink of the present embodiment, it is preferable that the ketone compound of general formula (1) and the solvent other than the ketone compound be appropriately mixed so as to make the flashing point of the solvent 35° C. or more.

Known pigments and dyes may be used as the colorants mixed with in the ink of the present embodiment.

Examples of pigments include organic pigments such as pigment yellow 12, 13, 14, 17, 20, 24, 31, 55, 74, 83, 86, 93, 109, 110, 117, 125, 128, 129, 137, 138, 139, 147, 148, 150, 153, 154, 155, 166, 168, 180, 181, 185, pigment orange 16, 36, 38, 43, 51, 55, 59, 61, 64, 65, 71, pigment red 9, 48, 49, 52, 53, 57, 97, 122, 123, 149, 168,177, 180, 192, 202, 206, 215, 216, 217, 220, 223, 224, 226, 227, 228, 238, 240, 244, 254, pigment violet 19, 23, 29, 30, 32, 37, 40, 50, pigment green 7, 36, pigment brown 23, 25, 26, and pigment black 7, 26, 27, 28. Examples of other pigments include pigments with a different shade of red, green, blue, brown, or white; metal glossy pigments such as gold and silver; and colorless or pale-colored extender pigments, which may be used according to the intended use. Examples of inorganic pigments include titanium oxide, iron oxide, ultramarine, chrome yellow, zinc sulfide, cobalt blue, barium sulfate, and calcium carbonate. Examples of other usable pigments include particles that include a core material particle such as silica, alumina, and resin, and a dye or a pigment adhering to the core particle surface; insoluble dye lakes; color emulsions; and color latexes. It is also possible to use resin-coated pigments. Such pigments are called microcapsule pigments, and are commercially available from DIC Corporation and Toyo Ink.

The volume average particle diameter of the pigment particles mixed in the ink of the present embodiment ranges preferably from 10 to 250 nm, more preferably from 50 to 200 nm from the standpoint of keeping good balance between optical density and preservation stability. The volume average particle diameter of the pigment particles can be measured using, for example, a measurement device such as an LB-500 (HORIBA).

The dye may be, for example, an oil dye. Examples of black dyes include C.I. Solvent Black (hereinafter, SBk)-3, SBk-7, SBk-22, SBk-45, and SBk-50. Examples of color dyes include C.I. Solvent Yellow (hereinafter, SY)-19, SY-61, SY-82, SY-93, Solvent RED (hereinafter, SR)-8, SR-18, SR-49, SR-81, Solvent Blue (hereinafter, SB)-2, SB-5, SB-36, SB-70, and Solvent Violet-21.

The colorant may be used either alone or as a mixture of two or more.

The mixed amount of the colorant in the ink of the present embodiment is preferably 0.1 to 15 mass %, more preferably 0.5 to 10 mass %, further preferably 1 to 10 mass %, particularly preferably 1 to 5 mass % with respect to the total ink amount.

The ink of the present embodiment may contain a fixing resin. Examples of the fixing resin include acrylic resin, polyester resin, and vinyl chloride copolymer resins such as a vinyl chloride-vinyl acetate resin.

The acrylic resin may be obtained from commercially available products such as Joncryl J-683 sol, and Joncryl J-819 sol (BASF).

Examples of the vinyl chloride-vinyl acetate resin include a vinyl chloride/vinyl acetate copolymer, a vinyl chloride/vinyl acetate/maleic acid copolymer, a vinyl chloride/vinyl acetate/vinyl alcohol copolymer, and mixtures of these. The vinyl chloride-vinyl acetate resin may be obtained from commercially available products such as Solbin CL, and Solbin C5R (Nissin Chemical Industry Co., Ltd.).

The polyester resin may be an amorphous polyester, or a crystalline polyester. Commercially available products such as Vylon 660, Vylon GK-810, Vylon 200, and Vylon 220 (Toyobo) also may be used as the polyester resin.

The content of the fixing resin in the ink of the present embodiment is preferably 1 to 5 mass % with respect to the total ink amount. With a fixing resin content less than 1 mass %, abrasion resistance tends to decrease. Above 5 mass %, the discharge of the ink through the head tends to become difficult. Considering these, the fixing resin content is more preferably 1.5 to 2.5 mass %, further preferably 2 to 3 mass %.

The ink of the present embodiment may include additives such as polymer dispersants, surfactants, plasticizers, antistatic agents, viscosity adjusters, defoaming agents, antioxidants, and ultraviolet absorbers, as required. Preferably, a pigment dispersant is mixed when a pigment is mixed as the colorant. The pigment dispersant is preferably a polyester polyamide resin that has two or more amide groups within the molecule, and a number average molecular weight of 2,000 to 30,000.

Preferably, the ink of the present embodiment contains a pigment as the colorant, and a vinyl chloride copolymer resin as the fixing resin. In this case, preservation stability can be improved while sufficiently maintaining pigment dispersibility, and changes in the particle size distribution of the pigment after long storage can be suppressed. It is possible to further suppress changes in the particle size distribution of the pigment when the vinyl chloride copolymer resin has high solubility for the solvent. In the present embodiment, changes in the particle size distribution of the pigment can be suppressed more effectively by mixing a vinyl chloride copolymer resin of a composition with a high vinyl acetate content. The inventors of the present invention believe that the foregoing effect is obtained because the vinyl chloride copolymer resin of a composition with a high vinyl acetate content can desirably dissolve in a solvent containing the ketone compound of general formula (1).

The ink of the present embodiment has a viscosity of preferably 2.5 to 5.0 mPa·s, more preferably 3.5 to 4.5 mPa·s, at 25° C. In this way, the ink of the present embodiment can be preferably used as an ink for inkjet printing.

The ink of the present embodiment can be prepared by uniformly mixing and dispersing the foregoing components using a known method. Examples of the disperser used to prepare a dispersion include a ball mill, a sand mill, an attritor, a roller mill, an agitator, a Henschel mixer, a colloid mill, a ultrasonic homogenizer, a pearl mill, a wetjet mill, and a paint shaker.

The ink of the present embodiment can preferably be used for inkjet printing.

The ink of the present embodiment can be used to form a predetermined image on media such as a vinyl chloride sheet, and tarpaulin.

EXAMPLES

The present invention is described below in more detail based on examples. It should be noted that present invention is not limited by the following descriptions.

Preparation of Ink Solvent (Solvents 1 to 4)

The components presented in Table 2 were mixed using a stirrer in the proportions (mass %) given in the table to prepare solvents for ink. The solvent viscosity was measured at 25° C., 20 rpm conditions using an E-type viscometer. The flashing point of the solvent was measured using a tag closed-cup automatic flashing point tester.

TABLE 2

|  | Solvent 1 | Solvent 2 | Solvent 3 | Solvent 4 |
|---|---|---|---|---|
| Ethyl lactate | 35 | 33 | 0 | 33 |
| Butyl lactate | 20 | 20 | 0 | 15 |
| γ-Butyrolactone | 30 | 25 | 30 | 25 |
| Propylene diglycol monomethyl ether acetate | 0 | 7 | 15 | 7 |
| 3-Methoxy-n-butyl-acetate | 10 | 10 | 23 | 10 |
| 2-Octanone | 0 | 5 | 7 | 0 |
| 2-Heptanone | 5 | 0 | 0 | 0 |
| Propylene diglycol acetate | 0 | 0 | 15 | 10 |
| Dipropylene glycol dimethyl ether | 0 | 0 | 10 | 10 |
| η (mPa · s) | 3.96 | 3.41 | 3.45 | 3.58 |
| F.P. (° C.) | 63.00 | 65.00 | 66.50 | 66.00 |

[Wind Test]

Prints made by using solvents 1 to 4 were wound around a paper core as the solvent was printed on a white vinyl chloride glossy medium 「SPC-0481」 (Nichiei Kakoh Co., Ltd.) under the print conditions below using the inkjet printer 「JV5」 (Mimaki Engineering Co., Ltd.). The printed surface and the paper board of the print roll were visually checked for the presence or absence of an offset and blocking. This procedure was repeated under different print densities (%), and the highest density at which an offset and blocking do not occur was determined. The results are presented in Table 3.

(Print Conditions)

Draft: 540×1080 dpi/high speed (40 (m$^2$/h))/6 pass/bidirectional

Fine: 720×1080 dpi/high speed (20 (m$^2$/h))/6 pass/bidirectional

Heater temperature: 35° C., 40° C.

TABLE 3

|  | Solvent 1 | | Solvent 2 | | Solvent 3 | | Solvent 4 | |
|---|---|---|---|---|---|---|---|---|
|  | Draft | Fine | Draft | Fine | Draft | Fine | Draft | Fine |
| Heater/35° C. | 240% | 240% | 240% | 270% | 240% | 270% | 180% | 240% |
| Heater/40° C. | 240% | 270% | 270% | 270% | 270% | 270% | 240% | 240% |

Print density is set based on the amount of applied ink per unit area

[Evaluation Test of Print Image Quality]

Prints made by using solvents 1 to 4 were wound around a paper core as the solvent was printed on a white vinyl chloride glossy medium 「SPC-0481」 (Nichiei Kakoh Co., Ltd.) under the print conditions below using the inkjet printer 「JV5」 (Mimaki Engineering Co., Ltd.). The printed surface of the print roll was visually checked for the presence or absence of bleeding. This procedure was repeated under different print speed (m$^2$/h) settings, and the highest print speed that permits printing without bleeding was determined. The results are presented in Table 4.

Print Conditions

Draft: 540×1080 dpi/high speed mode

Fine: 720×1080 dpi/high speed mode

Heater temperature: Pre-heater: 40° C. /platen heater: 40° C. /post-heater: 50° C.

TABLE 4

|  | Solvent 1 | Solvent 2 | Solvent 3 | Solvent 4 |
|---|---|---|---|---|
| Draft | 12.2 m²/h | 24.4 m²/h | 40.0 m²/h | 12.2. m²/h |
| Fine | 10.8 m²/h | 17.0 m²/h | 17.0 m²/h | 10.8 m²/h |

Preparation of Ink and Evaluation of Preservation Stability

Examples 1 and 2

The components presented in Table 5 were mixed at the composition ratios (mass %) given in the table to prepare inks. The preservation stability of each ink was then evaluated using the methods below.

Details of each component in the table are as follows.

Pigment: Carbon black

Solbin CL: Vinyl chloride-vinyl acetate resin, Nissin Chemical Industry Co., Ltd.; weight-average molecular weight 25,000; Tg 70° C.

Solbin C5R: Vinyl chloride-vinyl acetate resin, Nissin Chemical Industry Co., Ltd.; weight-average molecular weight 27,000; Tg 68° C.

SS39000: Dispersant

SS5000: Dispersant

W-100EL: Epoxidized soybean oil

TABLE 5

|  |  | Example 1 | Example 2 |
|---|---|---|---|
| Pigment | Carbon black | 3.0% | 3.0% |
| Fixing resin | Solbin CL | 0.5% | 0 |
|  | Solbin C5R | 2.0% | 2.5% |

TABLE 5-continued

|  |  | Example 1 | Example 2 |
|---|---|---|---|
| Solvent | 2-Octanone | 6.44% | 6.44% |
|  | γ-Butyrolactone | 27.60% | 27.60% |
|  | Propylene glycol monomethyl ether acetate | 13.8% | 13.8% |
|  | 3-Methoxy-n-butyl-acetate | 21.16% | 21.16% |
|  | Propylene diglycol acetate | 13.8% | 13.8% |
|  | Dipropylene glycol dimethyl ether | 9.20% | 9.20% |
| Other | SS39000 | 0.6% | 0.6% |
|  | SS5000 | 0.9% | 0.9% |
|  | W-100EL | 1.0% | 1.0% |

[Evaluation of Preservation Stability]

Figure 2:
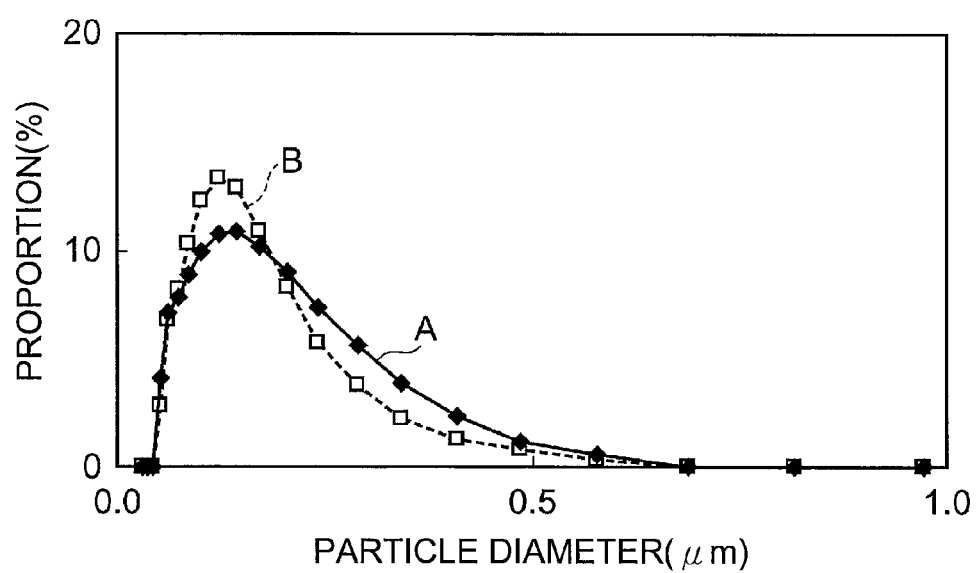
FIG. 2 is a graph representing the particle size distribution of a pigment in an ink of Example 2.

First, the particle size distribution of the pigment in the ink obtained above was measured by using a dynamic light scattering method (microtrack particle size analyzer). Then, the ink was stored at 60° C. for 12 days. The particle size distribution of the pigment in the ink was also measured as above after the storage. The results of the particle size distribution measurements are presented in FIGS. 1 and 2. FIG. 1 is a graph representing the particle size distribution of the pigment in the ink of Example 1. FIG. 2 is a graph representing the particle size distribution of the pigment in the ink of Example 2. In FIGS. 1 and 2, A represents the initial particle size distribution, and B represents the particle size distribution after the storage at 60° C. for 12 days.

It was confirmed that changes in the particle size distribution of the pigment was more suppressed in the ink of Example 2 than in the ink of Example 1.

The invention claimed is:

1. An ink used for an ink jet which prints on a medium formed by vinyl chloride, comprising:
    a pigment;
    a solvent comprising a lactic acid ester;
    a ketone selected from 2-heptanone or 2-octanone; and
    a vinyl chloride copolymer resin.

\* \* \* \* \*